(12) United States Patent
Sugiyama

(10) Patent No.: US 7,216,737 B2
(45) Date of Patent: May 15, 2007

(54) ACOUSTIC ISOLATOR BETWEEN DOWNHOLE TRANSMITTERS AND RECEIVERS

(75) Inventor: Hitoshi Sugiyama, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 391 days.

(21) Appl. No.: 10/771,213

(22) Filed: Feb. 3, 2004

(65) Prior Publication Data

US 2005/0167101 A1   Aug. 4, 2005

(51) Int. Cl.
*G01V 1/00* (2006.01)
*G01V 1/16* (2006.01)
*G01V 1/22* (2006.01)
*G01V 1/40* (2006.01)

(52) U.S. Cl. .................. 181/108; 181/102; 181/106; 181/113; 367/25; 367/162

(58) Field of Classification Search .............. 181/102, 181/106, 108, 111, 112, 113, 122; 384/49, 384/52, 57, 96, 108, 139, 147, 275, 276, 384/283, 507; 464/180, 182; 285/49, 299; 248/562, 566, 570, 580; 188/378, 379

See application file for complete search history.

(56) References Cited

U.S. PATENT DOCUMENTS

| 3,493,921 A | | 2/1970 | Johns |
|---|---|---|---|
| 4,872,526 A | | 10/1989 | Wignall |
| 4,893,796 A | * | 1/1990 | Hickman et al. ........... 267/136 |
| 5,036,945 A | * | 8/1991 | Hoyle et al. ................ 181/104 |
| 5,081,611 A | | 1/1992 | Hornby |
| 5,387,767 A | | 2/1995 | Aron |
| 5,728,978 A | | 3/1998 | Roberts et al. |
| 5,808,191 A | | 9/1998 | Alexy, Jr. et al. |
| 5,954,169 A | * | 9/1999 | Jensen ........................ 188/378 |
| 6,206,574 B1 | * | 3/2001 | Sonoda et al. .............. 384/507 |
| 6,478,110 B1 | * | 11/2002 | Eatwell et al. .............. 181/207 |
| 6,520,257 B2 | * | 2/2003 | Allamon et al. ............ 166/291 |
| 6,637,559 B2 | * | 10/2003 | Hoose .................... 188/322.16 |
| 6,659,196 B1 | * | 12/2003 | Anderson .................... 175/44 |
| 2004/0012500 A1 | * | 1/2004 | Hahn et al. .............. 340/854.4 |
| 2004/0016549 A1 | * | 1/2004 | Selinger et al. ............. 166/369 |

* cited by examiner

*Primary Examiner*—Lincoln Donovan
*Assistant Examiner*—Jeremy Luks
(74) *Attorney, Agent, or Firm*—Karan Singh; William Batzer; Dale Gaudier

(57) ABSTRACT

Apparatus and methods for acoustically isolating logging tool receiver and transmitter sections. One or more modular isolators is arranged between the receiver and transmitter sections. The modular isolators comprise a high tensile strength while also providing for a high wave attenuation level. The modular isolators are mechanical mass-spring systems capable of absorbing acoustic waves propagating along the logging tool. The mass is a swinging sleeve, and the spring includes a Belleville spring stack. The use of the strong modular isolators provides acoustic isolation between the transmitters and receivers for the complete sonic frequency band at multiple modes.

45 Claims, 4 Drawing Sheets

ACOUSTIC ISOLATOR BETWEEN DOWNHOLE TRANSMITTERS AND RECEIVERS

FIELD OF THE INVENTION

The present invention relates generally to methods for investigating subsurface formations using sonic measurements made in a borehole. More particularly, this invention is directed to methods and apparatus for acoustically isolating between transmitters and receivers of a downhole acoustic tool.

BACKGROUND OF THE INVENTION

The generation and recording of borehole acoustic waves is a key measurement employed in oilfield wireline logging. Many borehole tools and methods are currently available for taking acoustic measurements. Some tools include a single source of sonic waves and two or more receivers; however, most of the tools now include many receivers arranged in an array. While the currently available acoustic tools are useful in providing a large range of information regarding the adjacent formation and the borehole parameters, a primary use of acoustic borehole measurements is the estimation of compressional wave formation slowness.

Compressional or extensional wave formation slowness is typically estimated using travel times acquired via a first motion detection process. In the case of a single source, two receiver tool suggested by the prior art, formation slowness is estimated by subtracting the arrival times between two receivers and dividing by the inter-receiver spacing. This estimate, however, is subject to inaccuracies due to tool tilt, borehole washouts, bed boundary effects, etc. Additional acoustic sources and receivers and more robust methods such as STC (Slowness-Time-Coherency analysis) among others have been used to reduce the inaccuracies introduced by such environmental effects.

The above described travel time measurement technique for determining formation slowness suffers from other shortfalls as well. Many existing methods provide only one-dimensional values of formation slowness along the borehole axis and discards valuable information inherent in the signal regarding properties of the formation in other directions such as radial (i.e. shear) and/or azimuthal directions that are perpendicular to the borehole axis. However, it is useful to induce a flexural or dipole mode to enable shear measurements.

To overcome the difficulty in assessing the slowness distribution in both the axial and radial directions, a travel time tomographic inversion (namely "tomography") can be employed. The aim of a travel time tomographic inversion is to find a solution or a model (i.e. formation slowness distribution along and around a borehole) that minimizes the discrepancy between measured travel times and calculated ones at all source-receiver pairs. The governing equation of travel time tomography is generally non-linear but can be solved by an iterative solution algorithm starting with an initial model. At each iteration of this solution process, the following two steps are executed: forward modeling and inversion. By "forward modeling", the travel time is calculated for each source and receiver pair with a given model (from either an initial guess or the result of the previous iteration). However, since the model used is unlikely to be the true subsurface model, the calculated travel times are typically not consistent with the actual measured travel times. Hence, followed by this "forward modeling" step, the discrepancy between the actual measured and the calculated travel times is calculated and then minimized by an optimization/minimization method (e.g. a back-projection or conjugate-gradient) to update/adjust the previous resultant model. These two steps are conducted iteratively until a best fit is achieved (i.e. the travel time errors converge). Thus, the final solution model is obtained.

U.S. Pat. No. 5,081,611 (B. Hornby, 1992) proposed such a tomography method based on inversion of travel times measured by a sonic tool. Hornby alleges that his method is able to determine slowness distributions away from the borehole. The method disclosed by Hornby, however, is not in frequent use, presumably because the modeling kernel based on a ray tracing technique for refraction waves is unreliable. In addition, the Hornby method requires implicitly imposed virtual layers along the borehole axis, which lacks robustness regarding prior information and geological support. Furthermore, the method taught by Hornby is limited to only two dimensions, i.e. along borehole axis and one of the radial directions.

As described previously, the modeling is a required step in this tomographic inversion and its robustness and efficiency is crucial to the success of the inversion. Although ray tracing is a well know numerical simulation technique and widely used in acoustic domain for travel time computations, there are numerous limitations of this method preventing its robust use for sonic tomography. For instance, the sonic tool itself provides a direct link between the transmitter and the receivers. The propagation of the waves through the tool string introduces noise to the measurement signals. Accordingly, there has been some introduction of intra-tool acoustic isolators between transmitters and receivers to reduce signal noise. One method of acoustic isolation is to increase the distance between the transmitters and receivers. However, the greater the spacing between the transmitters and receivers, the lower the acoustic signal amplitude. Therefore, it is desirable to limit the length between the transmitters and receivers, and yet to also acoustically isolate them from one another along the tool string.

In addition, the mechanical strength requirements of an acoustic isolator are rigorous for most downhole tools. Many downhole tools extend downhole for thousands of meters, and therefore an isolator must have adequate strength to support any portions of the tool suspended therefrom. In addition, there may be well deviations that the isolator must be able to negotiate, all the while maintaining structural integrity and still acoustically isolating the receivers and transmitters. However, typical isolators are not strong enough to support high operational tensile loads, negotiate well deviations, and still provide acoustic isolation both in the extensional and flexural measurement target frequencies.

The present invention is directed to overcoming, or at least reducing the effects of, one or more of the problems outlined above.

SUMMARY OF THE INVENTION

The present invention meets the above-described needs and others. Specifically, the present invention provides apparatus and methods for isolating acoustic transmitters and receivers while also providing high tensile strength. The present invention utilizes a mass-spring mechanical filter to attenuate wave propagation through acoustic logging tools.

The mass-spring mechanical filter has a high tensile strength and is operable in high temperature and high pressure environments. The mass-spring mechanical filter may be modular, with several stages connected together. The multiple stages provide a lower cutoff frequency than previously available.

According to some embodiments, the present invention provides a downhole acoustic tool apparatus including: an acoustic source, an acoustic receiver, and an acoustic isolator disposed between the acoustic source and acoustic receiver. The acoustic isolator includes a modular mass-spring mechanical filter that may have two or more stages. According to one embodiment, each stage comprises a housing, a swinging sleeve having a first end attached to a tool string via a first ball joint and extending into the housing, and a first stack of spring disks adjacent to the swinging sleeve for absorbing swinging and axial movement of the expandable sleeve. The first ball joint includes a collar disposed about the first end of the swinging sleeve, and first and second balls disposed between an inner surface of the collar and an outer surface of the first end of the swinging sleeve for allowing the swinging sleeve to swing. The swinging sleeve has a first axis, and the first and second balls allow the swinging sleeve to swing like a pendulum against a force of the first stack of spring disks. The apparatus may also include at least one additional ball disposed between an outer surface of the collar and a tool fitting for allowing axial sliding movement of the swinging sleeve and collar against a force of the first stack of spring disks. However, the first ball joint does not permit axial rotation, thus providing the alignment necessary for accurate dipole measurements. Embodiments employing a second stage include a bellows joint attaching subsequent stages to previous stages. The bellows joint comprises a flexible metallic bellows filled with a fluid, and an internal metal mesh spring to prevent metal-to-metal contact between bellows joint components when the tool deviates from a standard position.

According to other embodiments the present invention provides an acoustic isolator including an isolator stage; the isolator stage comprising a housing having first and second ends, a disc spring stack disposed in the housing, and a swinging sleeve comprising first and second ends and bearing against the disc spring stack at a first end of the housing. The swinging sleeve is axially slidable into the housing and transversely swingable about a ball joint. The swinging sleeve is not axially rotatable about the ball joint. The isolator stage also includes a bellows joint at the second end of the housing, and, according to some embodiments, another isolator stage connected to the bellows joint. The housing generally includes a polished outer surface to reduce disruption of dipole flexural modes. The isolator stage comprises a tensile strength of at least 1000 lbs, preferably at least 2000 lbs, while providing at least a 20 dB attenuation level for compressional and shear wave sonic frequencies. According to some embodiments the isolator stage provides at least a 50 dB attenuation level.

Another aspect of the invention provides a method of attenuating acoustic wave propagation through an acoustic tool by inserting a moveable mechanical sleeve abutting a disc spring stack between transmitter and receiver sections of the acoustic tool. The method may include inserting a plurality of movable, ball-jointed mechanical sleeves, each abutting a disc spring stack, between transmitter and receiver sections of the acoustic tool. Each disc of each disc spring stack may be isolated from adjacent discs with porous plastic rings to improve isolation performance.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF THE PREFERRED EMBODIMENTS

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates acoustic isolation between transmitters and receivers of acoustic tools, particularly sonic logging tools. Historically there has been some use of sonic isolators between transmitters and receivers, but the prior isolators tend to weaken the logging tool string, sometimes breaking at the isolator while still downhole. In addition, prior isolators are primarily plastic, which provides high material damping, but is also highly temperature dependent. Many downhole service applications require operations at high temperature and pressure, and high temperatures and pressures significantly compromise the isolation characteristics of prior plastic isolators. The present invention provides methods and apparatus for isolating between acoustic transmitters and receivers along a tool string without significantly weakening the string. The methods and apparatus also providing better wave attenuation characteristics over a wider range of conditions than previously possible. The isolation is accomplished with a relatively small spacing between the transmitters and receivers, and smaller spacing tends to facilitate higher amplitude measurements by the receivers. The methods and apparatus described herein facilitate acoustic isolation between transmitters and receivers across the full range of sonic frequencies and among all the useful sonic modes, including monopole and dipole modes.

As used throughout the specification and claims, the term "spring disk" means a conical shaped disc or washer used to store or absorb energy as a spring, also commonly known as a Belleville spring. The term "sonic" refers to acoustic or sound waves having a frequency range between approximately 1 and 25 kHz. A "pendulum" is a body suspended from a fixed support such that it swings freely. The words "including" and "having," as used in the specification, including the claims, have the same meaning as the word "comprising."

Figure 1:
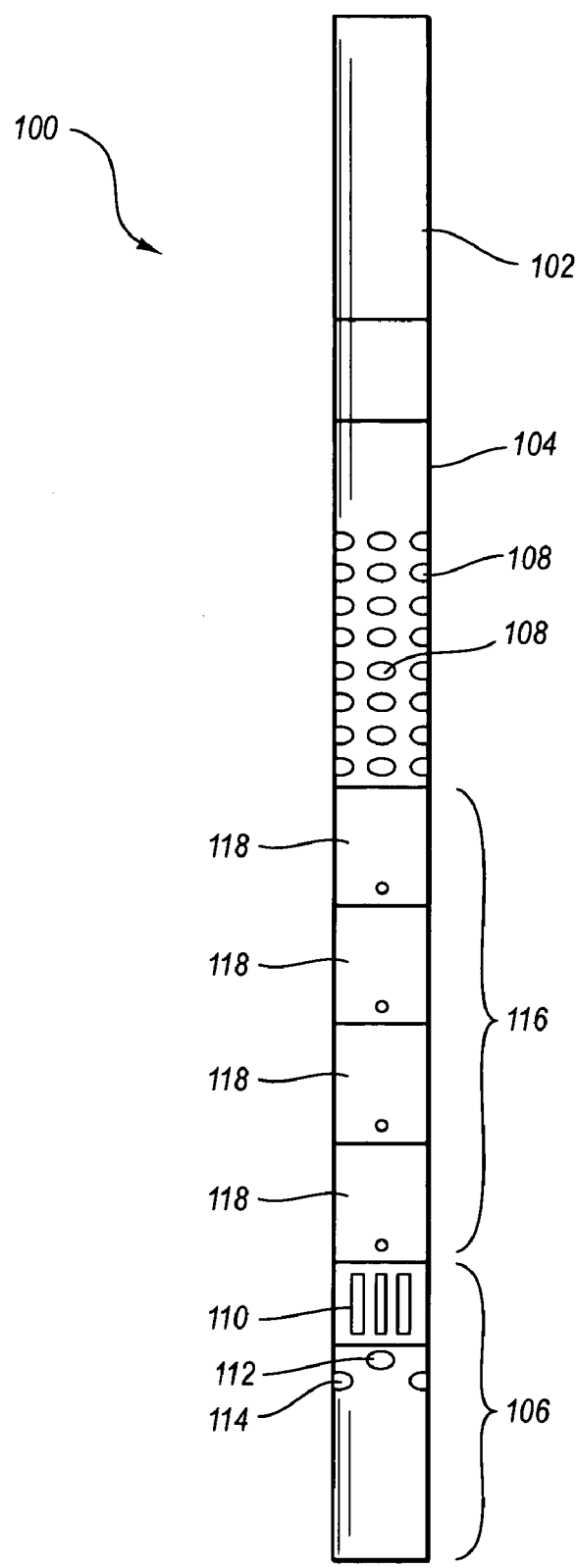
FIG. 1 is a front view of a sonic logging tool with a modular isolator according to one embodiment of the present invention.

Turning now to the figures, and in particular to FIG. 1, an acoustic tool, for example a sonic logging tool (100), is shown according principles of the present invention. As with many sonic tools, the sonic logging tool (100) is used for logging a borehole by taking various waveform measurements and communicating the measurements uphole. The sonic logging tool (100) therefore includes a processing and telemetry cartridge (102), a sonic receiver section (104), and a sonic transmitter section (106). The processing and telemetry cartridge (102) may include a computer processor for controlling the firing of sonic transmitters from the sonic transmitter section (106), the receipt of waveform measurements by the sonic receiver section (104), and communication to uphole equipment.

As shown in FIG. 1, the sonic receiver section (104) preferably includes an array of individual sonic receivers (108), and a number of sonic transmitters. For example, according to the embodiment of FIG. 1, the sonic transmitter section (106) includes a monopole transmitter (110), and upper and lower dipole transmitters (112, 114), respectively. The monopole transmitter (110) and the upper and lower dipole transmitters (112, 114), as well as the sonic receivers (108), facilitate compressional and shear measurements through adjacent formations and are readily available from a variety of sources.

As mentioned above, in order to reduce noise introduced to the sonic receivers (108) as a consequence of sonic waves propagating through the sonic logging tool (100) instead of through the adjacent formation, the sonic logging tool includes an acoustic or sonic isolator section (116). According to the embodiment of FIG. 1, the sonic isolator section (116) comprises a plurality of acoustic or sonic isolators or isolator stages (118). As shown in FIG. 1, there are four isolator stages (118), although there may be as few as one or as many as twenty or more, depending on particular needs. According to the embodiment of FIG. 1, each of the plurality of isolator stages (118) is substantially identical to create a modular sonic isolator. However, each of the isolator stages (118) may also be somewhat different. For example, each of the isolator stages (118) may have different masses or spring constants. As shown in FIG. 1, each of the isolator stages (118) is polished smooth and substantially flush with each other and with an outer diameter of the sonic logging tool (100). Accordingly, the isolator stages (118) do not disturb sonic signals the way some prior isolators with rough out surfaces do.

Each of the isolator stages (118) comprises a mass-spring mechanical absorber or filter that attenuates the propagation of acoustic waves through the tool (100). The use of multiple isolator stages (118) also provides for a multiple stage filter, and thus provides a lower frequency arrival signal cutoff than previously available. However, each of the isolator stages (118) comprises a high tensile strength to support substantial weight that may suspend from the isolator stages (118). According to some embodiments, the tensile strength of each of the isolator stages (118) is at least 1000 lbs, and the isolator stages (118) are operable as sonic isolators while supporting such a load. Preferably, however, the tensile strength of each of the isolator stages (118) is at least 2000 lbs, and again, operable as sonic isolators while supporting such a load. Even at loads of at least 2000 lbs, the isolator stages (118), alone or in combination, attenuate acoustic energy levels by at least about 50 dB.

Figure 2:
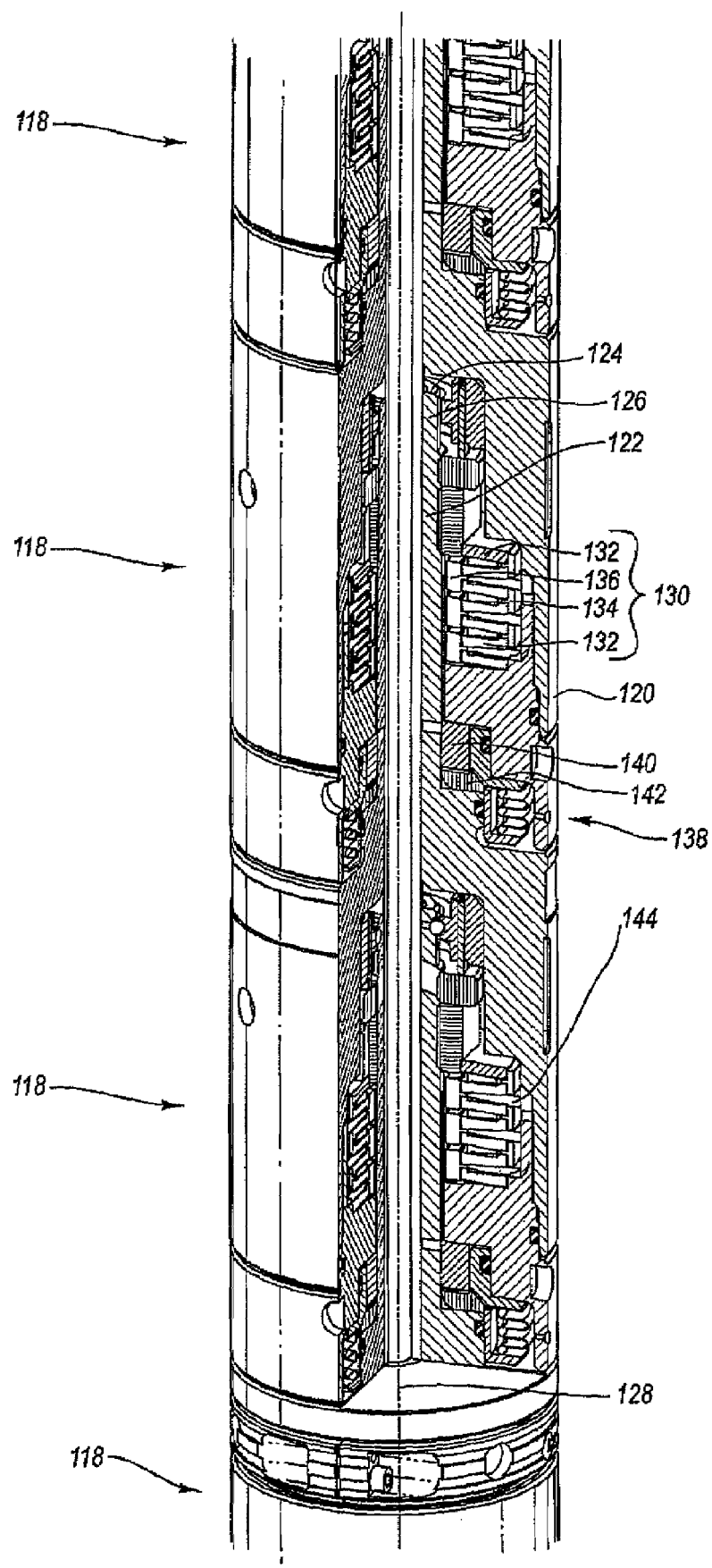
FIG. 2 is a perspective sectional view of several of the modular isolator stages shown in FIG. 1.

The mass-spring mechanical structure of the isolator stages (118) is shown in more detail with reference to FIG. 2. FIG. 2 illustrates in a cross-sectional cut-away view the details of the isolator stages (118). For purposes of clarity, only two of the isolator stages (118) are fully shown in FIG. 2 to illustrate principles of the invention. As shown in FIG. 2, each of the isolator stages (118) includes an outer housing (120) and a plurality of inner components. The outer housing (120) is preferably made of stainless steel or other structural materials. Inside of the outer housing (120) is a swinging sleeve (122) that provides a mass or pendulum of the mass-spring filtering structure. The swinging sleeve (122) is attached to an adjacent isolator stage (118) at a first end (124) by a ball joint (126). The ball joint (126) is shown and described in more detail below with reference to FIGS. 3–4. While the swinging sleeve (122) specifically identified is attached to an adjacent isolator stage (118), a swinging sleeve of a first or uppermost isolator stage (118) may be attached to a mating fitting of the sonic logging tool (100, FIG. 1) string. The ball joint (126) allows the swinging sleeve (122) to swing like a pendulum in any number of lateral directions with respect to a tool axis (128). In addition, the ball joint (126) allows limited sliding movement of the swinging sleeve (122) axially within the outer housing (120) along the tool axis (128). Accordingly, the swinging sleeve may respond to compressional and flexural sonic waves and cause them to be absorbed, rather than allowing them to propagate to the receiver section (104, FIG. 1).

However, to absorb and attenuate wave propagation through the sonic logging tool (100, FIG. 1), the acoustic or sonic energy received by the swinging sleeve (122) is transferred to a spring system. According to the embodiment of FIG. 2, the spring system is a Belleville or disc spring stack (130). The disc spring stack (130) provides compact and efficient spring forces that are used according to the present invention to absorb acoustic energy. According to the embodiment of FIG. 2, the disc spring stack (130) comprises a combination of seven discs (132), although any number of discs may be used to optimize frequency response and amplitude attenuation. The disc spring stack (130) is adjacent to the swinging sleeve (122) and provides a force against swinging and axial movement thereof. Accordingly, as the swinging sleeve (122) tends to move in response to wave energy emitted by the transmitter section (106, FIG. 1), the movement is absorbed by the disc spring stack (130).

The individual discs (132) of the disc spring stack (130) are isolated from one another according to the embodiment shown to prevent wave propagation from one disc (132) to another. If each of the discs (132) directly contacted a common shaft or one another, acoustic energy would pass therethrough. Therefore, the discs (132) are separated from one another by an outer spacer ring (134) and/or an inner spacer ring (136). The outer and inner spacer rings (134, 136) comprise a porous plastic or other sound-absorbing material.

Opposite of the ball joint (126), each of the isolator stages (118) connects to the next stage via a bellows joint (138). Like the ball joint (126), the bellows joint (138) allows axial and swinging motion, but prevents axial rotational movement. It may be desirable to preclude axial rotational movement, for example, when dipole wave measurements are taken. In between the bellows joint (138) and the next isolator stage (118) there may also be a bushing such as a metal mesh spring (140) and a porous plastic sponge (142). The metal mesh spring (140) and porous plastic sponge (142) may prevent direct metal-to-metal contact between the bellows joint (138) and other metallic components such as the swinging sleeve (122) if the sonic logging tool (100, FIG. 1) is bent, for example, by a well deviation. Direct metal-to-metal contact between the bellows joint (138) and other components may provide a wave propagation path that is not desirable for the sonic logging tool (100, FIG. 1). According to some embodiments, the interior of the outer housing (120) may be filled with a fluid such as oil, and with formed plastic inserts (144) to add to the sound absorbing capability of the disc spring stack (130). However, the ball joint (126) and the bellows joint (138) provide a support structure that is not compromised by the addition of weaker, sound absorbing materials such as the plastic inserts (144).

Figure 3:
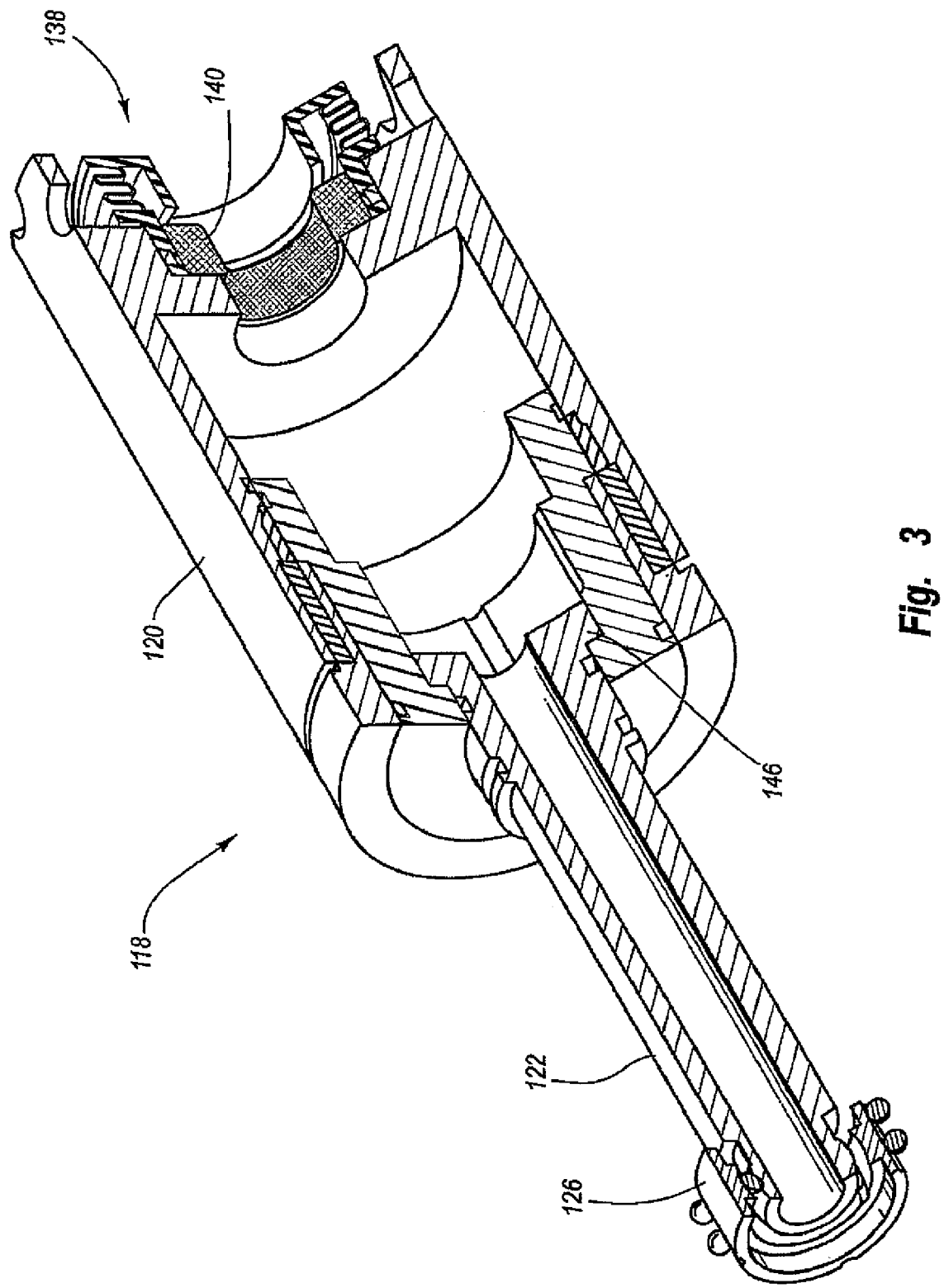
FIG. 3 is a perspective sectional view of one of the modular isolator stages shown in FIG. 2.
Figure 4:
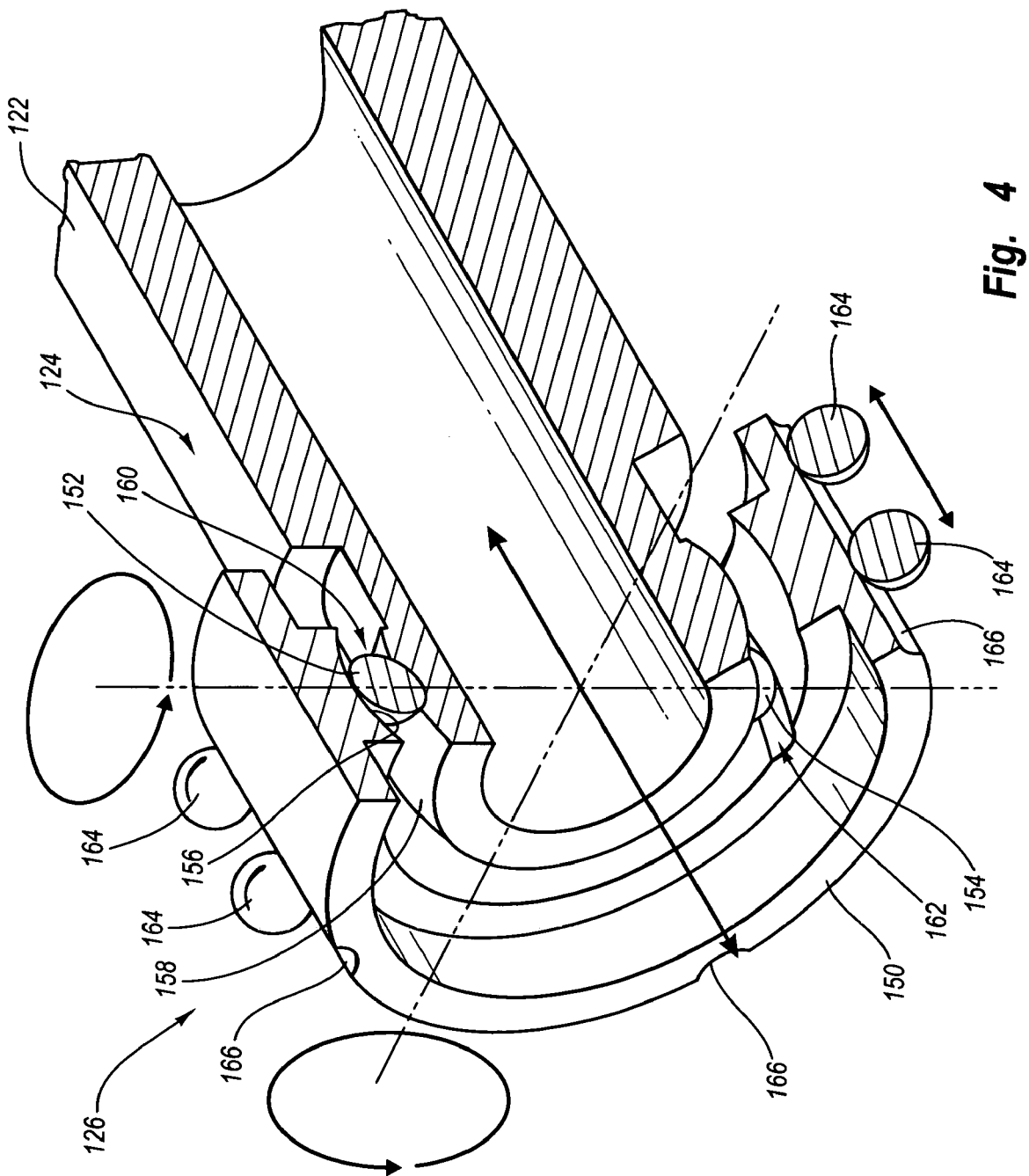
FIG. 4 is a detailed perspective view of a ball joint of the modular isolator stage shown in FIG. 3.

Turning next to FIGS. 3–4, an individual isolator stage (118) is shown in a cross-sectional view. As illustrated in FIG. 3, the swinging sleeve (122) may slide axially in and out of the outer housing (120), as well as swing laterally. However, the disc spring stack (130) provides sound-absorbing resistance at a second end (146) of the swinging sleeve (122) to attenuate wave propagation. The second end (146) of the swinging sleeve (122) abuts the disc spring stack (130) in the manner shown such that the disc spring stack resists both axial and lateral swinging motion. The bellows joint (138) allows flexibility between the isolator stage (118) and an adjacent isolator stage. The ball joint (126) allows both swinging and axial movement and is shown in more detail in FIG. 4.

Referring to FIG. 4, the ball joint (126) includes a collar (150) at the first end (124) of the swinging sleeve (122). At least one ball, and according to FIG. 4, first and second balls (152, 154), are disposed between an inner surface (156) of the collar (150) and an outer surface (158) of the swinging sleeve (122). The first and second balls (152, 154) are preferably located in first and second recesses (160, 162) which provide a limitation against axial rotational movement, but allow swinging movement along the ball surfaces. Further, the ball joint (126) may include additional sets of balls (164) as shown in FIG. 4 outside of the collar (150). The additional balls (164) allow sliding movement within additional recesses (166). The additional balls (164) may be disposed between the recesses (166) of the collar and matching recesses in either the bellows joint (138, FIG. 3), or a sonic tool string fitting (not shown).

Accordingly, as the transmitters of the sonic transmitter section (106, FIG. 1) are fired, sonic energy propagates through the sonic logging tool (100, FIG. 1) and toward the sonic receiver section (104, FIG. 1). However, the sonic energy causes the swinging sleeve mass (122) to move against a force provided by the spring disc stack (130, FIG. 2). Compressional wave energy causes the swinging sleeve mass (122) to slide axially along the additional balls (164, FIG. 4) of the ball joint (126, FIG. 4), and flexural wave energy causes the swinging sleeve (122, FIG. 3) to swing laterally along the first and second balls (152, 154, FIG. 4). The movement is resisted and absorbed by the disc spring stack (130), attenuating the sound propagation significantly or entirely before it reaches the sonic receiver section (104, FIG. 1). Accordingly, the sonic measurements taken by the receivers (108, FIG. 1) are more likely to contain formation signals and less likely to contain noise resulting from propagation through the tool (100, FIG. 1).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A downhole acoustic tool apparatus comprising:
    an acoustic source;
    an acoustic receiver; and
    an acoustic isolator disposed between the acoustic source and acoustic receiver, the acoustic isolator comprising:
        an outer housing;
        a member shaped to extend inside the outer housing;
        a spring assembly in a space between the member and an inner wall of the outer housing,
        wherein the member is configured to slide axially and swing laterally in the outer housing; and
        the member and the spring assembly are configured to attenuate acoustic energy propagating through the apparatus.

2. The tool of claim 1, wherein the
    outer housing has a first part and a second part;
    one end of the member extending in the first part of the housing and configured to slide and swing thereof;
    the other end of the member being attached to an inner part of the second part of the housing such that the second part of the housing moves with the member; and
    the spring assembly comprises a stack of spring disks configured for absorbing swinging and axial movement of the member.

3. The tool of claim 1, wherein at least one end of the member is movably attached to the outer housing with a ball joint assembly;
    the ball joint assembly comprising:
    a collar disposed about the end of the member;
    a first ball disposed between an inner surface of the collar and an outer surface of the end of the member for allowing the member to swing.

4. The tool of claim 3, further comprising a first recess defined between the inner surface of the collar and the outer surface of the end of the member, the first ball disposed in the first recess; and further comprising a second ball disposed in a second recess defined between the inner surface of the collar and the outer surface of the end of the member.

5. The tool of claim 4, wherein the first and second balls are arranged substantially opposite of one another.

6. The tool of claim 5 wherein the member comprises a first axis, and wherein the first and second balls allow the member to swing as a pendulum against a force of the spring assembly.

7. The tool of claim 3, further comprising at least one additional ball disposed between an outer surface of the collar and a tool fitting for allowing axial sliding movement of the member and collar against a force of the spring assembly.

8. The tool of claim 7, wherein the at least one additional ball comprises at least two balls disposed within axially aligned recesses disposed between the outer surface of the collar and the tool fitting limiting axial rotation of the member with respect to the tool.

9. A downhole acoustic tool apparatus comprising:
an acoustic source;
an acoustic receiver; and
an acoustic isolator disposed between the acoustic source and acoustic receiver, the acoustic isolator comprising:
an outer housing;
a plurality of interconnected stages, each stage comprising:
a member shaped to extend inside the outer housing;
a spring assembly between the member and the outer housing,
wherein the member is configured to slide axially and swing laterally in the outer housing such tat a part of the outer housing moves with movement of the member; and
the member and the spring assembly are configured to attenuate acoustic energy propagating through the apparatus.

10. The tool of claim 9, wherein a first stage is attached by a bellows joint to a second stage.

11. The tool of claim 10, wherein the bellows joint comprises a flexible metallic bellows filled with a fluid.

12. The tool of claim 10, wherein the bellows joint comprises an internal metal mesh spring to prevent metal-to-metal contact between bellows joint components when the tool deviates from a standard position.

13. A downhole acoustic isolator apparatus comprising:
a tool string;
an acoustic receiver section;
an acoustic transmitter section; and
at least one isolator stage separating the acoustic receiver section from the acoustic transmitter section, the at least one isolator stage comprising:
an outer housing;
a member having a first end attached to a part of the housing and a second end configured for movement;
a spring assembly between the member and the housing,
wherein the member and housing are configured such that the part of the housing attached with the member moves with the member; and
the member and the spring assembly are configured to attenuate acoustic energy propagating through the apparatus.

14. The apparatus of claim 13, further comprising:
a ball joint at the second end of the member;
a bellows joint at one end of the isolator stage;
and a disc spring stack between the ball joint and the bellows joint.

15. The apparatus of claim 14, wherein the ball joint comprises a dual-motion ball bearing facilitating swinging movement of the member and axial movement of the member, each against the disk spring stack.

16. The apparatus of claim 15, wherein the ball joint comprises a collar disposed about the second end of the member; first and second ball bearings disposed between the collar and the second end of the member, and third and fourth ball bearings disposed between the collar and the bellows joint or a tool string fitting.

17. The apparatus of claim 13, further comprising two isolator stages, wherein a ball joint of a second of the two isolator stages connects to a bellows joint of a first of the two isolator stages.

18. The apparatus of claim 17, further comprising four isolator stages, wherein the ball joint of a third of the four isolator stages connects to the bellows joint of the second of the four isolator stages, and wherein the ball joint of a fourth of the four isolator stages connects to the bellows joint of the third of the four isolator stages.

19. The apparatus of claim 14, wherein the disc spring stack further comprises a plurality of disc springs, wherein each of the discs springs is separated from an adjacent disc by acoustic absorbing plastic rings.

20. The apparatus of claim 19, wherein the plurality of disc springs comprises a stack of seven disc springs.

21. The apparatus of claim 14, further comprising a metal mesh spring at the bellows joint preventing metal-to-metal contact of bellows joint components upon apparatus deviation from a standard axial position.

22. The apparatus of claim 14, wherein the ball joint and bellows joint each allow swinging movement and axial movement but prevent rotational movement.

23. The apparatus of claim 14, wherein the disc spring stack and bellows joint absorb compressional and flexural acoustic energy along the apparatus from the transmitter section of a predetermined frequency range.

24. A acoustic isolator comprising:
an isolator stage; the isolator stage comprising:
a housing having first and second ends;
a member shaved to extend from the first end of the housing;
a first end of the member configured to slide axially and swing laterally and a second end of the member attached with the housing such that the housing moves with movement of the member; and
a spring assembly,
wherein the member and the spring assembly are configured to attenuate acoustic energy propagating through the isolator.

25. The isolator of claim 24, wherein the member is not axially rotatable.

26. The isolator of claim 24, further comprising a bellows joint at the second end of the housing.

27. The isolator of claim 26, further comprising another isolator stage connected to the bellows joint.

28. The isolator of claim 27, further comprising a series of four isolator stages connected to one another.

29. The isolator of claim 24, wherein the housing comprises a polished outer surface.

30. The isolator of claim 27, wherein the housing comprises a single diameter enclosing the spring assembly and the bellows joint.

31. The isolator of claim 24, wherein the isolator stage comprises a tensile strength of at least 1000 lbs while providing at least a 20 dB attenuation level for compressional and shear wave sonic frequencies.

32. A logging tool comprising:
a tool string;
a sonic receiver section;
a sonic transmitter section;
at least one isolator stage separating the sonic receiver section from the sonic transmitter section, The at least one isolator stage comprising:
a housing having first and second parts;
a member shaped to extend inside the first part of the housing and a first end of the member attached to the second part of the housing;
a ball joint at a second end of the member inside the first part of the housing;
a bellows joint between the first and second parts of the housing; and
a disc spring stack between the member and an inner wall of the first part of the housing;

wherein the ball joint and bellows joint are configured to permit axial movement and swinging pendulum movement, but restrict axial rotation, and the member and the disc spring stack are configured to attenuate acoustic energy propagating through the logging tool; and a computer coupled to the sonic receiver section and the sonic transmitter section and programmed to calculate and update slowness measurements for sonic waves generated by the sonic transmitter and received by the sonic receiver section.

33. The logging tool of claim 32 wherein the isolator stage absorbs sonic waves generated by the sonic transmitters to prevent the some waves from propagating though the logging tool.

34. The logging tool of claim 33, wherein the disc spring stack absorbs the sonic waves by resisting axial and swinging movement of the isolator stage in response to compressional and flexural waves through the logging tool.

35. The logging tool of claim 32, farther comprising four isolator stages connected to one another between ball joints and bellows joints.

36. The logging tool of claim 32, wherein the at least one isolator stage comprises an fluid filled outer housing, and wherein an internal portion of the isolator stage comprises formed plastic.

37. The logging tool of claim 32, wherein the at least one isolator stage comprises a tensile strength of at least 2000 lbs while providing at least a 20 dB attenuation level for compressional and shear wave sonic frequencies.

38. A method of attenuating acoustic wave propagation through an acoustic tool comprising:
providing an acoustic isolator having an outer housing between transmitter and receiver sections of the acoustic tool;
inserting a moveable mechanical member in the outer housing having one end that is moveable and the other end attached to the outer housing such that the outer housing moves with the moveable member;
configuring a spring assembly in a space between the moveable member and an inner wall of the housing,
wherein the member and the spring assembly are configured to attenuate acoustic energy propagating through the acoustic tool.

39. The method of claim 38, further comprising inserting a plurality of movable, ball-jointed mechanical members, each abutting a disc spring stack, between transmitter and receiver sections of the acoustic tool.

40. The method of claim 39, further comprising isolating each disc of each disc spring stack from adjacent discs with individual porous plastic rings.

41. The method of claim 39 further comprising connecting the plurality of movable mechanical sleeves with bellows joints.

42. The tool of claim 1, wherein one end of the member is moveably attached to the outer housing with a ball joint assembly and the other end of the member is attached to a portion of the outer housing such that the portion of the outer housing moves with movement of the member.

43. The tool of claim 1, wherein the outer housing has a first part and a second part, the first housing part having a receiver section of the acoustic tool and the second housing part having the acoustic isolator, wherein one end of the acoustic isolator is connected with the receiver section.

44. The tool of claim 1, wherein the outer housing has a first part and a second part, the first housing part having a transmitter section of the acoustic tool and the second housing part having the acoustic isolator, wherein one end of the acoustic isolator is connected with the transmitter section.

45. The apparatus of claim 13, wherein the outer housing has first and second parts, the first end of the member being attached to the first part of the housing and the second end of the member being moveably attached inside the second part of the housing.

* * * * *